United States Patent
Mattsson

(10) Patent No.: US 7,195,574 B2
(45) Date of Patent: Mar. 27, 2007

(54) CONTINUOUSLY VARIABLE TRANSMISSION FOR HYBRID MOTOR VEHICLES

(75) Inventor: Per Mattsson, Hindås (SE)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 10/851,026

(22) Filed: May 21, 2004

(65) Prior Publication Data
US 2005/0014592 A1 Jan. 20, 2005

(30) Foreign Application Priority Data
May 21, 2003 (EP) .................... 03011525

(51) Int. Cl.
*F16H 3/72* (2006.01)
(52) U.S. Cl. ............................................ 475/5
(58) Field of Classification Search ............... 475/5; 903/910, 911
See application file for complete search history.

(56) References Cited

U.S. PATENT DOCUMENTS

| | | | | |
|---|---|---|---|---|
| 5,558,589 A | * | 9/1996 | Schmidt | 475/5 |
| 5,603,671 A | * | 2/1997 | Schmidt | 475/5 |
| 5,730,676 A | * | 3/1998 | Schmidt | 475/5 |
| 6,793,600 B1 | * | 9/2004 | Hiraiwa | 475/5 |

* cited by examiner

*Primary Examiner*—Dirk Wright
(74) *Attorney, Agent, or Firm*—David B. Kelley

(57) ABSTRACT

Motor vehicle transmission, comprising an input shaft (27) adapted to be drivingly connected to an output shaft of an internal combustion engine, a variator in the form of two electric machines (22, 40) having a first and a second input/output shaft (21, 41), a planetary gear train (1) for splitting power between the input shaft (27) and one of the input/output shafts (21, 41) when transmitting torque to an output gear wheel (35) of the transmission and first clutch means (13) having an engaged position establishing torque transmission between one of the input/output shafts and the output gear wheel via the the planetary gear train and a disengaged position disrupting this torque transmission. A gear train (42, 34, 31) is arranged to enable torque transmission from one of the input/output shafts to the output gear wheel, thereby by-passing the planetary gear train. Second clutch means (39) has an engaged position to establish and a disengaged position to disrupt said last mentioned torque transmission. The gear train (42, 34, 31) has a first gear wheel (42) mounted on the input/output shaft (41) meshing with a gear wheel (34) on an intermediate shaft (33). A gear wheel 31 is rotatably journalled on the intermediate shaft and is lockable on the shaft by second clutch means (39) to transmit torque from the input/output shaft (41) to the output gear wheel (35).

10 Claims, 1 Drawing Sheet

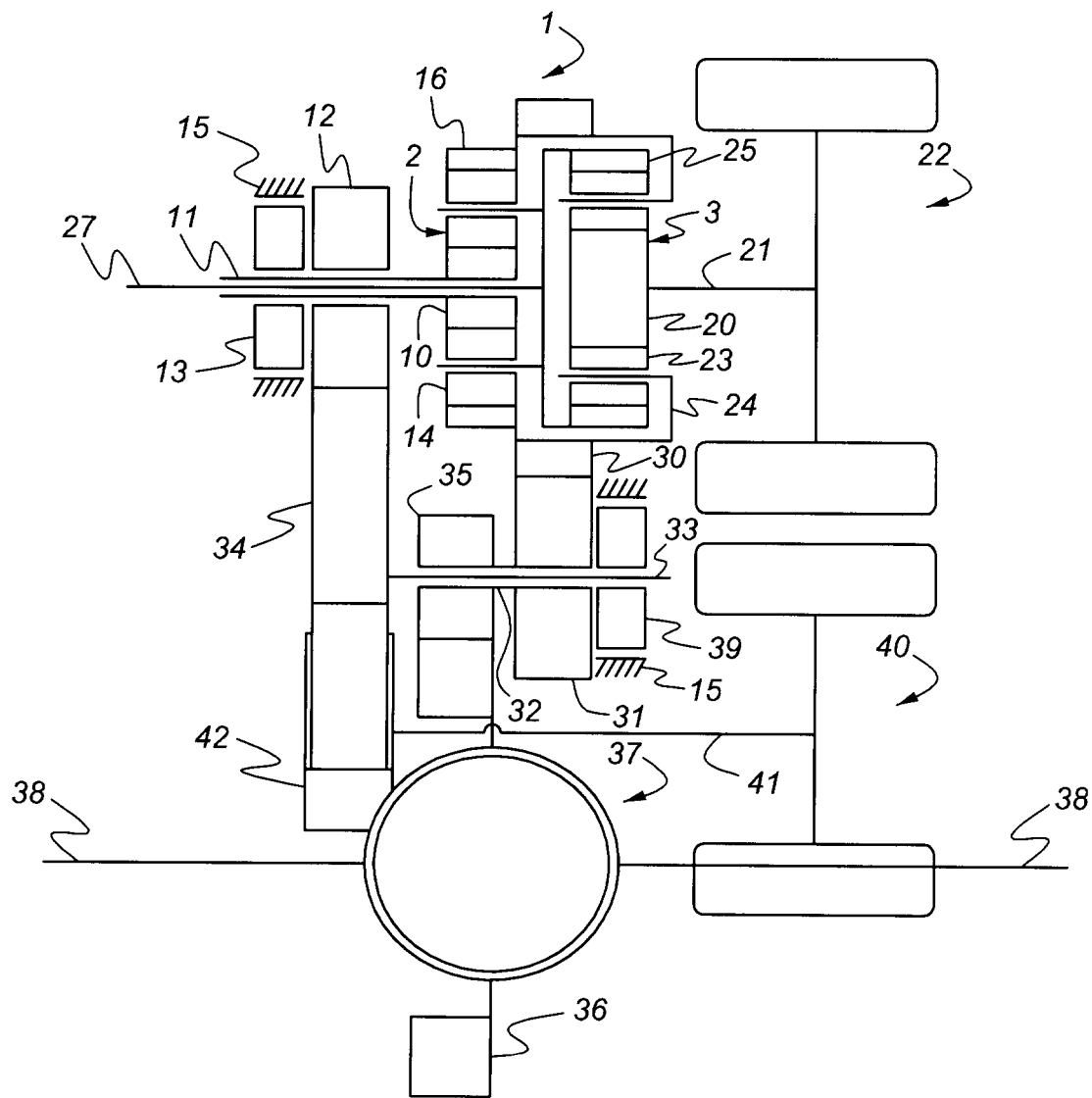

CONTINUOUSLY VARIABLE TRANSMISSION FOR HYBRID MOTOR VEHICLES

FIELD OF THE INVENTION

The present invention relates to motor vehicle transmissions generally, and more specifically to continuously variable transmissions for use in hybrid vehicles.

BACKGROUND OF THE INVENTION

Transmissions with continuously variable gear ratios (CVT) using variators in the form of two electric machines, each one of which being capable to operate either as a generator or as a motor, are well known and are used in some hybrid car models available on the market today in which the electric machines are used alone or in parallel with the combustion engine as a driving power source. Common to these hybrid cars available on the market is that one of the electric machines is always linked to the transmission output shaft and hence its speed is coupled to the speed of the vehicle over the whole speed range, that is even in the high speed range.

The driveability, performance and fuel economy of a hybrid car can be improved if the above described "single mode" operated electromechanical CVT were to be replaced with a transmission of the present invention which has two modes of operation. In low mode, i.e. reverse driving, standstill with engine running and forward driving in low speed, e.g. below 50 km/h, the transmission is controlled so that the variator (electric machines) delivers torque via a separate gear train to the output side of the transmission, thereby by-passing the planetary gear train, while the combustion engine torque is transmitted via the planetary gear train. In high mode which is for driving in higher speeds the transmission is controlled so that both the engine and the variator deliver torque via the planetary gear train. In this manner each gear train can be optimized for a certain speed range.

However, due to packaging requirements due to the size of the electric machines required, among other things, cars equipped with a two mode CVT using two electric machines as a variator have not yet been commercially available.

SUMMARY OF THE INVENTION

The purpose of the present invention is generally to achieve a gearbox of the type described herein, which is especially suited for use in motor vehicles with transverse engines which only leave a very limited space for the gearbox at the end of the engine.

This is achieved according to the invention by virtue of the fact that said gear train comprises a first gear wheel drivable by one of said input/output shafts, a second gear wheel mounted on an intermediate shaft and drivable by said first gear wheel and a third gear wheel rotatably journalled on the intermediate shaft and lockable on the intermediate shaft by said first clutch means to transmit torque from one of said input/output shafts to said output means.

One advantage of using an intermediate shaft to transmit torque from one of the electric machines to output means of the transmission, e.g. a gear wheel meshing with the crown wheel of a differential, is that the electric machines can be spaced apart transversely without overlapping one another so that only the length of one electric machine will be added to the total length of the transmission.

The present invention therefore relates to a motor vehicle transmission comprising an input shaft adapted to be drivingly connected to an output shaft of an internal combustion engine, a variator having a first and a second input/output shaft, a planetary gear train having at least two interconnected planetary gear sets for splitting power between said input shaft and one of said input/output shafts when transmitting torque to output means of the transmission, first clutch means having an engaged position establishing said torque transmission between one of said input/output shafts and said output means via said planetary gear train and a disengaged position disrupting said torque transmission, a gear train arranged to enable torque transmission from one of said first and second input/output shafts to said output means thereby by-passing said planetary gear train and second clutch means having an engaged position establishing said last mentioned torque transmission and a disengaged position disrupting said last mentioned torque transmission.

BRIEF DESCRIPTION OF THE DRAWING

The invention will be described in more detail below with reference to the accompanying drawing, wherein the FIGURE shows a diagrammatic representation of an embodiment of a transmission according to the invention.

DETAILED DESCRIPTION OF THE PREFERRED EMBODIMENTS OF THE INVENTION

The transmission comprises a planetary gear train 1 made up of a first planetary gear set 2 and a second planetary gear set 3.

The first gear set 2 has a sun gear 10 which is non-rotatably mounted on a hollow shaft 11 carrying rotatably a gear wheel 12 which is lockable on the hollow shaft 11 by means of a first dog clutch 13. The sun gear 10 meshes with planet gears 14 on a planet carrier 15, said planet gears 14 also meshing with a ring gear 16.

The second gear set 3 has a sun gear 20 which is non-rotatably mounted on an input-output shaft 21 of a first electric machine 22 which can operate either as a driving motor or as a generator. The sun gear 20 meshes with planet gears 23 on a planet carrier 24, said planet gears 23 also meshing with a ring gear 25 which is connected to the planet carrier 15 of the first planetary gear set 2. The planet carrier 24 is connected to the ring gear 16 of the first planetary gear set 2.

An input shaft 27 adapted to be connected to an output shaft of an internal combustion engine (not shown) is also connected to the planet carrier 15 of the first gear set 2 and consequently also to the ring gear 25 of the second gear set 3.

A gear wheel 30 is connected to the ring gear 16 of the first gear set 2 and consequently also to the planet carrier 24 of the second gear set 3. The gear wheel 30 meshes with a gear wheel 31 which is non-rotatably mounted on a hollow shaft 32 rotatably journalled on a shaft 33. A gear wheel 34 non-rotatably mounted on the shaft 33 meshes with the gear wheel 12 on the hollow shaft 11. A second gear wheel 35 non-rotatably mounted on the hollow shaft 32 meshes with a crown wheel 36 of a differential 37 between two drive shafts 38 of a vehicle. By means of a second dog clutch 39 the hollow shaft 32 can be locked to shaft 33.

A second electric machine 40 which can operate either as a driving motor or as a generator has an output-input shaft 41 carrying non-rotatably a gear wheel 42 meshing with the gear wheel 34 on the shaft 33.

The transmission described, which is an electromechanical transmission with continuously variable gear ratio, has two basic modes of operation.

In mode 1 which enables reverse driving, standstill with engine running (geared neutral) and forward driving in low and moderate speeds dog clutch 13 is released and dog clutch 39 is engaged to non-rotatably connect the hollow shaft 32 to the shaft 33. When running the electric machine 40 as a motor in mode 1 torque is transmitted from its shaft 41 and gear wheel 42 via the gear wheel 34 on the shaft 33 and the gear wheel 35, which is locked to the shaft 33, to the crown wheel 36 of the differential 37.

In mode 1 during standstill, with the combustion engine running and the machine 22 electrically switched off from generator mode operation so that no braking torque is applied on the shaft 21 of the machine 22, the input shaft 27 will rotate the ring gear 25 which through the planet gears 23 will rotate the sun gear 20 in an opposite direction. Simultaneous rotation of the planet carrier 15 only results in rotation of the shaft 11 which is released from the gear wheel 12.

When a braking force is applied on the shaft 21 by operating the electric machine 22 as a generator the sun gear 21 will be braked and the planet carrier 24 will start rotating, the rotational speed of which, i.e. the gear ratio of the transmission, being dependent on the braking force applied on the shaft 21. Torque will then be transmitted from the combustion engine, i.e. the input shaft 27, to the crown wheel 36 of the differential 37 via the second planetary gear set 3, the gear wheel 30, the gear wheel 31 and the gear wheel 35. If the electrical machine 40 is also operated as a motor torque will simultaneously be transmitted from its shaft 41 to the crown wheel 36 via the gear wheels 42, 34 and 35.

In mode 2 which is for forward driving in higher speeds dog clutch 39 is released and dog clutch 13 is engaged to non-rotatably connect the gear wheel 12 to the hollow shaft 11. When running the electric machine 40 as a motor in mode 2 torque is transmitted from its shaft 41 and gear wheel 42 via the gear wheel 34, the gear wheel 12, the shaft 11, the sun gear 10, the planet gears 14 and the ring gear 16 of the first planetary gear set 2 to the gear wheel 30 and from there via the gear wheels 31 and 35 on the released hollow shaft 32 to the crown wheel 36 of the differential 37.

The overall speed ratio of the transmission can be varied continuously by varying the speeds of the electric machines in relation to one another. There is a continuous and jerk-free transition between the two modes. The gear wheel 12, 34 and 30, 31, respectively, are adapted to one another so that the dog clutches 13 and 39 and the corresponding gear wheels 12 and 31, respectively, are rotating with the same speed at every mode shift so there is no need for synchronizers.

The planetary gear sets 2 and 3 are designed to split the transmission input power in such a way that except in the very low speed range, e.g. from standstill to approximately 20 km/h, less than 25% of the total power output from the transmission relates to the electric machines which gives a high overall efficiency for the transmission. Pure electric driving in low forward and reverse speeds is also possible in mode 1 as well as in mode 2. Pure electric driving with the electric machine 22 in mode 1 requires brake means (not shown) to brake the shaft 27.

At a specific overall speed ratio in mode 2 adapted for cruising the electric machine 40 has zero speed and hence no input-output power is transmitted via shaft 41. However, shaft 41 needs to supply a reaction force. This can be done either by electrically operating the machine 40 to apply a braking force to the shaft 41 or by arranging clutch means (not shown) which can lock either the shaft 41 or the shaft 33 to the transmission housing. If mechanical clutch means are used electrical power losses are avoided completely.

In case separate clutch means are arranged to lock either of said shafts 41, 33 to the housing these clutch means could also be used to mechanically lock the transmission when the vehicle is at standstill (parking brake) and mode 1 is selected. With dog clutch 39 locking the gear wheel 31 to the shaft 33 and with this shaft locked to the housing by said separate clutch means crown wheel 36 will be locked.

As an alternative, dog clutch 39 could be replaced with a double acting clutch having one position locking gear wheel 31 to the shaft 33 and another position locking shaft 33 to the housing 15. In this case separate parking brake means will be needed. Also the clutch 13 could be double acting so as to enable locking of the shaft 11 to the housing 15.

In the transmission described above a variator arrangement in the form of two electrical machines 22 and 40 are used which are electrically controlled in a manner known per se which need not be described in detail here. In mode 1 primarily the electrical machine 22 is operated as a generator supplying current to an electrical accumulator and to the other electrical machine 40 which in mode 1 is primarily operated as a motor. In mode 2 primarily the electric machine 40 operates as a generator to supply current to the accumulator and to the other electric machine 22 which in mode 2 is primarily operated as a motor.

Within the scope of the invention other variator arrangements than electrical ones could be used. The two electrical machines could, for example, be replaced with two hydraulic machines with variable displacement and capable of operating either as a pump or a motor.

What is claimed is:

1. A motor vehicle transmission, comprising an input shaft (27) adapted to be drivingly connected to an output shaft of an internal combustion engine, a variator (22,40) having a first and a second input/output shaft (21,41), a planetary gear train (1) having at least two interconnected planetary gear sets (2,3) for splitting power between said input shaft (27) and one of said input/output shafts (21,41) when transmitting torque to an output of the transmission, first clutch means (13) having an engaged position establishing torque transmission between one of said input/output shafts and said output means via said planetary gear train and a disengaged position disrupting said torque transmission, a gear train (42,34,31) arranged to enable torque transmission from one of said first and second input/output shafts to said output means thereby by-passing said planetary gear train and second clutch means (39) having an engaged position establishing said last mentioned torque transmission and a disengaged position disrupting said last mentioned torque transmission, and wherein said gear train comprises a first gear wheel (42) drivable by one of said input/output shafts (41), a second gear wheel (34) mounted on an intermediate shaft (33) and drivable by said first gear wheel and a third gear wheel (31) rotatably journalled on the intermediate shaft and lockable on the intermediate shaft by said second clutch means (39) to transmit torque from one of said input-output shafts to said output, wherein said output is a gear wheel (35) which is non-rotatably journalled relative to said third gear wheel (31) and meshes with a crown wheel (36) of a differential.

2. A transmission according to claim 1 wherein said gear train comprises a fourth gear wheel (12) which is rotatably journalled on a shaft (11) and lockable on this shaft by said first clutch means (13) to transmit torque from one of the input-output shafts (21,41) to the planetary gear train (1).

3. A transmission according to claim 2 wherein said first clutch means (13) are double acting so as to enable locking of said shaft (11) to a stationary element (15) of the transmission.

4. A transmission according to claims 1 wherein said second clutch means (39) has a position in which said third gear wheel (31) is rotatable on the intermediate shaft and the intermediate shaft (33) is locked to a stationary element of the transmission.

5. A transmission according to claim 2 wherein the fourth gear wheel (12) is rotatably journalled on a hollow shaft (11) which is arranged concentrically with said input shaft (27) and is drivingly connected to a sun gear (10) of the first planetary gear set (2), that a sun gear (20) of the second planetary gear set (3) is drivingly connected to one of the input/output shafts (21), that a planet carrier (15) of the first planetary gear set is non-rotatably connected to a ring gear (25) of the second planetary gear set and to said input shaft (27) and that a planet carrier (24) of the second planetary gear set and a ring gear (16) of the first planetary gear set are non-rotatably connected to a gear wheel (30) transmitting torque to said third gear wheel (31).

6. A transmission according to claim 5 wherein said gear wheel (30) transmitting torque to said third gear wheel (31) is a ring gear arranged concentrically with the planetary gear train (1) and with external teeth meshing with the teeth of said third gear wheel.

7. A transmission according to claim 1 wherein said first and second clutch means (13,39) are dog clutches without synchronizers.

8. A transmission according to claim 1 wherein the variator comprises a first and a second electric machine (22,40), each one being arranged to operate either as a generator or as a driving motor.

9. A motor vehicle transmission, comprising an input shaft (27) adapted to be drivingly connected to an output shaft of an internal combustion engine, a variator (22,40) having a first and a second input/output shaft (21,41), a planetary gear train (1) having at least two interconnected planetary gear sets (2,3) for splitting power between said input shaft (27) and one of said input/output shafts (21,41) when transmitting torque to an output of the transmission, first clutch means (13) having an engaged position establishing torque transmission between one of said input/output shafts and said output means via said planetary gear train and a disengaged position disrupting said torque transmission, said first clutch means (13) being double acting so as to enable locking of said shaft (11) to a stationary element (15) of the transmission, a gear train (42,34,31) arranged to enable torque transmission from one of said first and second input/output shafts to said output means thereby by-passing said planetary gear train and second clutch means (39) having an engaged position establishing said last mentioned torque transmission and a disengaged position disrupting said last mentioned torque transmission, and wherein said gear train comprises a first gear wheel (42) drivable by one of said input/output shafts (41), a second gear wheel (34) mounted on an intermediate shaft (33) and drivable by said first gear wheel and a gear wheel (31) rotatably journalled on the intermediate shaft and lockable on the intermediate shaft by said second clutch means (39) to transmit torque from one of said input-output shafts to said output.

10. A motor vehicle transmission, comprising an input shaft (27) adapted to be drivingly connected to an output shaft of an internal combustion engine, a variator (22,40) having a first and a second input/output shaft (21,41), a planetary gear train (1) having at least two interconnected planetary gear sets (2,3) for splitting power between said input shaft (27) and one of said input/output shafts (21,41) when transmitting torque to an output of the transmission, first clutch means (13) having an engaged position establishing torque transmission between one of said input/output shafts and said output means via said planetary gear train and a disengaged position disrupting said torque transmission, a gear train (42,34,31) arranged to enable torque transmission from one of said first and second input/output shafts to said output means thereby by-passing said planetary gear train and second clutch means (39) having an engaged position establishing said last mentioned torque transmission and a disengaged position disrupting said last mentioned torque transmission, said second clutch means (39) having a position in which said third gear wheel (31) is rotatable on the intermediate shaft and the intermediate shaft (33) is locked to a stationary element (15) of the transmission, and wherein said gear train comprises a first gear wheel (42) drivable by one of said input/output shafts (41), a second gear wheel (34) mounted on an intermediate shaft (33) and drivable by said first gear wheel and a gear wheel (31) rotatably journalled on the intermediate shaft and lockable on the intermediate shaft by said second clutch means (39) to transmit torque from one of said input-output shafts to said output.

* * * * *